(12) United States Patent
Flint

(10) Patent No.: US 10,505,639 B2
(45) Date of Patent: Dec. 10, 2019

(54) DOWN CONVERSION SYSTEM AND METHOD

(71) Applicant: LEONARDO MW LTD, Basildon, Essex (GB)

(72) Inventor: Ian Flint, Basildon (GB)

(73) Assignee: LEONARDO MW LTD, Basildon, Essex (GB)

( * ) Notice: Subject to any disclaimer, the term of this patent is extended or adjusted under 35 U.S.C. 154(b) by 0 days.

(21) Appl. No.: 15/539,394

(22) PCT Filed: Dec. 23, 2015

(86) PCT No.: PCT/EP2015/081178
§ 371 (c)(1),
(2) Date: Jun. 23, 2017

(87) PCT Pub. No.: WO2016/102678
PCT Pub. Date: Jun. 30, 2016

(65) Prior Publication Data
US 2018/0331764 A1 Nov. 15, 2018

(30) Foreign Application Priority Data

Dec. 23, 2014 (GB) .................................. 1423160.9

(51) Int. Cl.
| | |
|---|---|
| *H04B 10/516* | (2013.01) |
| *H04B 10/2575* | (2013.01) |
| *H04J 14/02* | (2006.01) |
| *H04K 3/00* | (2006.01) |
| *H04B 10/2507* | (2013.01) |

(52) U.S. Cl.
CPC ....... *H04B 10/516* (2013.01); *H04B 10/2575* (2013.01); *H04B 10/25752* (2013.01); *H04J 14/0213* (2013.01); *H04K 3/42* (2013.01); *H04K 3/825* (2013.01); *H04B 10/2507* (2013.01);
(Continued)

(58) Field of Classification Search
CPC .............. H04B 10/516; H04B 10/2575; H04B 2210/006; H04B 10/25752; H04B 10/2507; H04B 2203/14; H04B 2203/34; H04J 14/0213; H04J 14/02; H04J 14/023; H04K 3/42; H04K 3/825; G02B 6/2938; G02B 6/2931; G02B 6/2932
See application file for complete search history.

(56) References Cited

U.S. PATENT DOCUMENTS

| | | |
|---|---|---|
| 5,710,651 A | 1/1998 | Logan, Jr. |
| 2002/0141694 A1* | 10/2002 | Caplan ............. H04B 10/25137 385/24 |

(Continued)

OTHER PUBLICATIONS

International Search Report (PCT/ISA/210) dated May 3, 2016, by the European Patent Office as the International Searching Authority for International Application No. PCT/EP2015/081178.
(Continued)

*Primary Examiner* — Ted M Wang
(74) *Attorney, Agent, or Firm* — Buchanan Ingersoll & Rooney PC

(57) ABSTRACT

A system and method of down converting microwave (RF) signals into lower frequencies are disclosed, such that associated electronics can more precisely analyse the signals. Exemplary embodiment, can be applied to multiple RF bands by using several optical wavelengths.

16 Claims, 5 Drawing Sheets

(52) U.S. Cl.
CPC .... *H04B 2210/006* (2013.01); *H04K 2203/14* (2013.01); *H04K 2203/34* (2013.01)

(56) References Cited

U.S. PATENT DOCUMENTS

| | | |
|---|---|---|
| 2003/0090777 A1 | 5/2003 | Yap |
| 2009/0213880 A1* | 8/2009 | Ouchi ................ G01N 21/4795 372/21 |
| 2009/0232191 A1* | 9/2009 | Gupta ................ H04L 27/2096 375/216 |
| 2013/0177315 A1 | 7/2013 | Middleton et al. |
| 2013/0236187 A1 | 9/2013 | Middleton et al. |

OTHER PUBLICATIONS

Written Opinion (PCT/ISA/237) dated May 3, 2016, by the European Patent Office as the International Searching Authority for International Application No. PCT/EP2015/081178.

Erwin H. W. Chan et al., "Microwave Photonic Downconversion Using Phase Modulators in a Sagnac Loop Interferometer", IEEE Journal of Selected Topics in Quantum Electronics, vol. 19, No. 6, Nov./Dec. 2013.

\* cited by examiner

DOWN CONVERSION SYSTEM AND METHOD

The invention relates to a system and method of down conversion. More specifically but nor exclusively it relates to a system and method of down converting microwave (RF) signals into lower frequencies such that associated electronics can more precisely analyse the signals. Furthermore, the invention can be applied to multiple RF bands by using several optical wavelengths.

It is accepted that the next generation of multi-function systems will use fibre technology to interconnect sensors to output signal processing means in order to provide high data rates and low metallic content. Furthermore, there is a view that next generation sensors will also use RF optical links to reduce the power consumption and size of the electronics behind the sensing.

In past decades there have been many attempts to achieve microwave processing functionality such as downconversion & channelization (high EW band is 2-2-GHz so downconvert in freq pockets to analyse chunks mixed with freqs that trying to analyse), however the development of components such as dual modulator devices, wavelength multiplexing (WDM) have led to a range of new work being published that use COTS devices and make use of processing in the optical domain to achieve microwave performance.

The following references give a view of the scope of these publications. The common theme in these papers is various concepts for making use of single-side-band modulation and beating this with frequency shifted carrier signals.

The applications (if stated) are for digital data communications on an RF carrier frequency, providing downconversion to baseband, and in some cases using WDM to provide parallel channels.

In Tang (2014) "electronic warfare" is included in the introduction, but the method described is particular for downconversion of a digital modulation to baseband.

The cited references (above) consider various arrangements of optical modulator devices to achieve optical downconversion, however the arrangement in the present invention which also allows for remoted RF signals, is not specifically discussed.

Papers by Minasian (2012, 2014) present the closest method for downconversion, but with no application or wider context presented.

Using an OEO (optoelectronic oscillator) and a MZM (Mach-Zehnder modulator) to achieve direct photonic downconversion of a digitally amplitude modulated microwave signal to baseband is disclosed in Zhenzhou Tang, Fangzheng Zhang, and Shilong Pan Photonic microwave downconverter based on an optoelectronic oscillator using a single dual-drive Mach-Zehnder modulator Optics Express, Vol. 22, Issue 1, pp. 305-310 (2014).

Using a single-side band modulator and a shift signal generated as an optical comb plus a filter to remove the original carrier to down convert a digital RF signal, plus using WDM with an array of modulators to introduce down conversion of parallel links has been disclosed in Ting Zhang et al. High-Spectral-Efficiency Photonic Frequency Down-Conversion Using Optical Frequency Comb and SSB Modulation, Volume 5, Number 2, April 2013.

A review of a number of concepts for photonic processing which includes various ideas for using beating between sidebands to provide a down-converted signal is disclosed in R. A. Minasian, E. H. W. Chan, X. Yi, Microwave photonic signal processing, Optics Express, Vol. 21, Issue 19, pp. 22918-22936 (2013).

Erwin H. W. Chan, Robert A. Minasian, Microwave Photonic Downconverter with High Conversion Efficiency, Journal of Lightwave Technology, Vol. 30, no. 23, Dec. 1, 2012 presents a method of using a one dual MZ modulator device to achieve microwave downconversion.

The prior art disclosed above, is largely electronically based. Photonic technology can be integrated in to current systems. For example, there are systems available that use tens of optical carrier laser modulators and a mux which combines multiple wavelengths by wavelength division multiplexing (WDM) onto one chip inside a 2.5×2.5 cm package. In one form of the present invention, this allows the entire EW frequency band to be address by channelising. This is done by having a local oscillator (LO) and an analogue to digital converter (ADC) for each 2 GHz RF band. Alternatively the optical LO frequency can be changed rapidly (in a low number of nano seconds) thereby allowing the receiver to "set on" to any particular EW signal to analyse it.

According to the invention there is provided a method of down converting a wide bandwidth microwave (RF) signal spectrum into lower frequencies using photonics such that processing electronics can more precisely analyse the signals.

According to the invention there is provided a method of down converting a wide bandwidth microwave (RF) signal spectrum into lower frequencies using photonics such that processing electronics can more precisely analyse the signals comprising the steps of providing a plurality of wavelength channels in parallel; combining the wavelengths, passing the combined wavelengths through a modulator; passing a received antenna signal through said modulator, the modulator outputting a signal having characteristics relating to the input antenna signal, generating an output signal by deconvoluting the signal output from the modulator.

According to the invention there is further provided a device for down converting a wide bandwidth RF antenna signal in to lower frequencies comprising a plurality of radiation emitters the radiation emitted being input to WDM transmitter means, the output of the WDM transmitter means being output to modulator means, the modulator means receiving the RF antenna signal, the output of the modulator means being shifted by an amount in relation to the antenna signal, the device further comprising a WDM receiver means, the WDM receiver means receiving the signal output by the modulator and outputting a signal directly relating to the RF signal received by the RF antenna to ADC means, the ADC means outputting signals to digital signal processing means for onward processing.

The use of photonics in the present invention allows any antenna to be remotely located on a wing of an aircraft without loss of RF performance when conveying the signal to the electronics bay. A single RF amplifier and modulator can be used behind the antenna to modulate multiple WDM optical signals so the entire EW can be covered simultaneously.

Furthermore, if the RF signals are already on an optical carrier, this present invention utilises methods to provide the RF downconversion and band limiting filtering within the optical domain, where the extra space and size to add these functions is very low compared to typical RF frequency converters and filters.

Considering the method according to one form of the invention of downconversion by using the beating between the RF sideband and a frequency shifted, the present invention discloses system for a wide bandwidth microwave signal spectrum as opposed to the systems described in the references above that are concerned with digital communications using a fixed carrier.

Photonics has the potential benefits of high RF isolation, EMI resistance, small size and non-varying performance over a wide RF frequency range. In addition to fulfilling the RF processing functions it is possible to provide parallel processing at little extra overhead. Because the optical frequency is very high compared to the RF frequency the "spurious" mixing products that are seen from an electronic "mixer" are out of the receiver bandwidth so are not seen.

From the prior art "The SFDR of the microwave photonic link with photonic downconversion was compared with the SFDR from a conventional microwave mixer. In every spur measurement, the photonic mixer outperformed the conventional microwave mixer by at least 30 dB [51]. As empirically demonstrated, mixing in the optical regime provided significantly reduced spurious signals over state-of-the-art electronic mixers while maintaining operation over wider instantaneous bandwidths."

Currently ADCs can precisely digitise RF signals up to 2 GHz. Electronic warfare requires signals to be digitise up to several tens of GHz. By down converting the signals to lower frequency signals any signal up to several 10's of GHz can be analysed by conventional ADCs.

The present invention aims to provide such a system whilst overcoming the problems associated with the prior art.

The invention will now be described with reference to the accompanying diagrammatic drawings in which.

Figure 1:
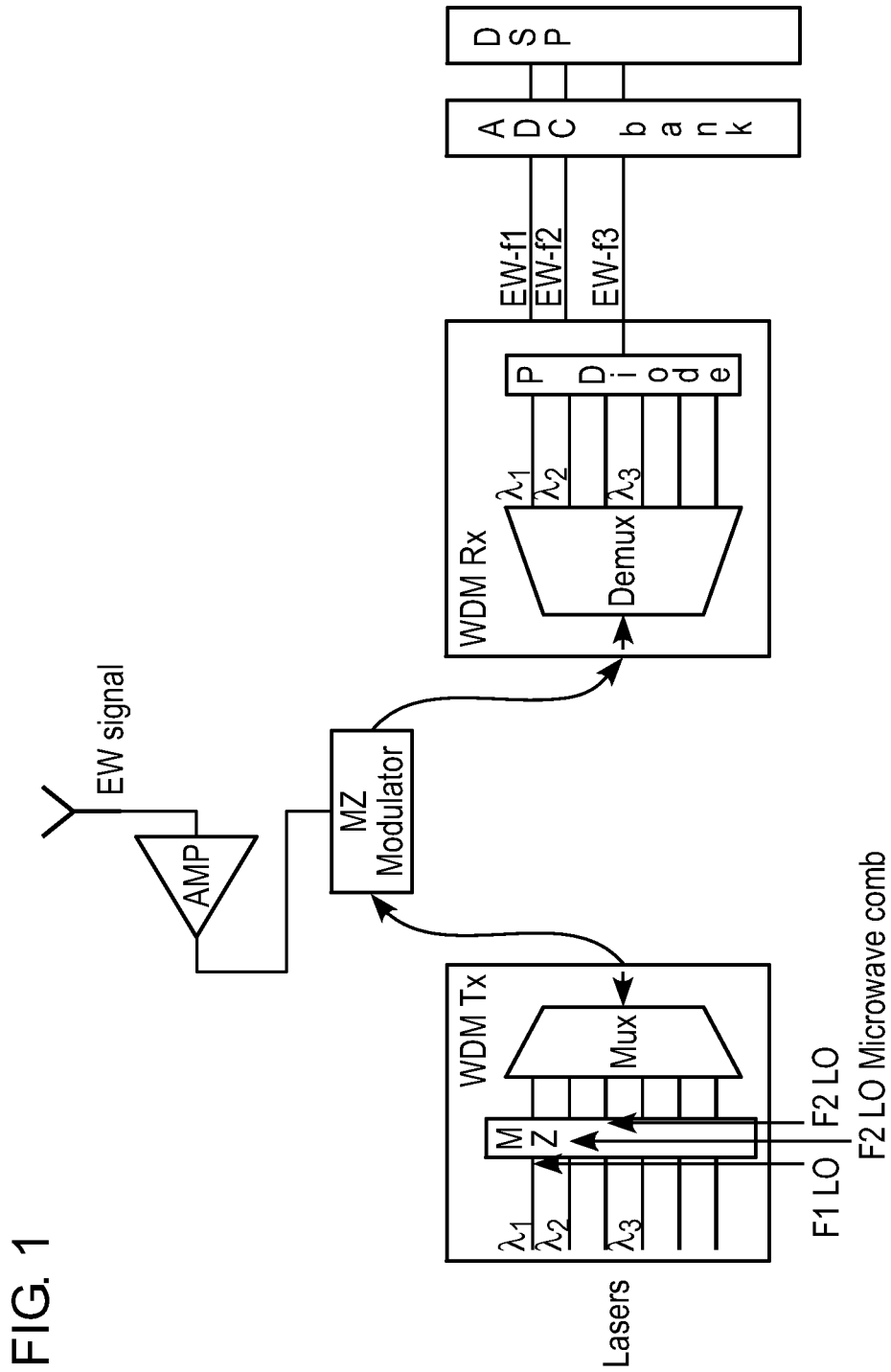
FIG. 1 is a schematic implementation diagram of one form of the invention showing an RF antenna with transmit and receive modules in which Local Oscillator (LO) signals are imposed on multiple optical wavelengths using Mach-Zehnder (MZ) modulators.

As shown in FIG. 1, a WDM transmitter comprises, different laser emitters I1 I2 and I3 that may be built in to InP substrates, with in the region of 10 to 40 channels. The outputs from the emitters are input in to a MZ modulator which combines the light and constructive or destructive interference may occur. The output from the MZ modulator is input in to a multiplexer (MUX). The multiplexer may comprise an array waveguide grating, for example Bragg gratings may be used. The waveguides constructively interfere and are output from the multiplexer.

The output from the multiplexer is transmitted via a suitable fibre in to a further modulator which may be a further MZ modulator or any other suitable form of single sided modulator that is not optically sensitive.

The output from this further modulator produces sideband signals shifted by the input frequency from the antenna. This shifts with LO frequencies in the modulator, which is polarisation sensitive.

It is possible for a comparative signal to be transmitted either of a different polarisation via the further modulator or directly via a fibre to the WDM receiver.

In the WDM receiver, a second AWG splits out the signal in to separate wavelengths I1 I2 and I3. However, the wavelengths are now shifted by an amount indicative of the antenna input signal.

Mixing of these output wavelengths occurs in photodiodes and signals EW1 EW2 and EW3 are output to an ADC and on to a relevant signal processing unit DSP.

It will be appreciated that the ADC may only see 2 Gb therefore it is necessary for enough channels to be mixed such that the appropriate A to D can analyse the signal.

A typical input signal is 2-20 so 18 GHz in total so in this example 9 channels would be required. A single 12 input ADC can analyse 2 GHz.

Figure 2:
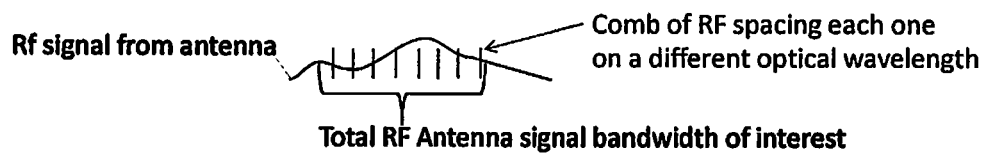
FIG. 2 is a schematic diagram showing a comb of RF spacings, each one on a different optical wavelength superimposed on an RF signal from an antenna.
Figure 3:
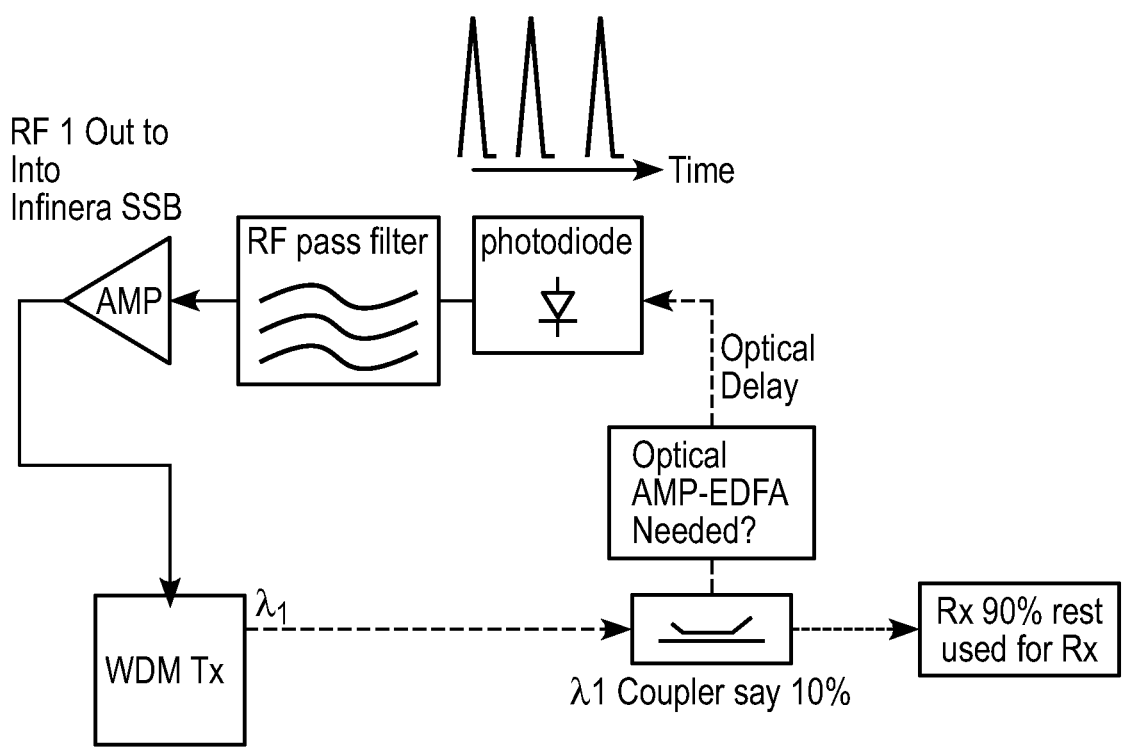
FIG. 3 is a schematic diagram of one form of the present invention showing a system for the generation of microwave carriers using a low grade OEO.
Figure 4:
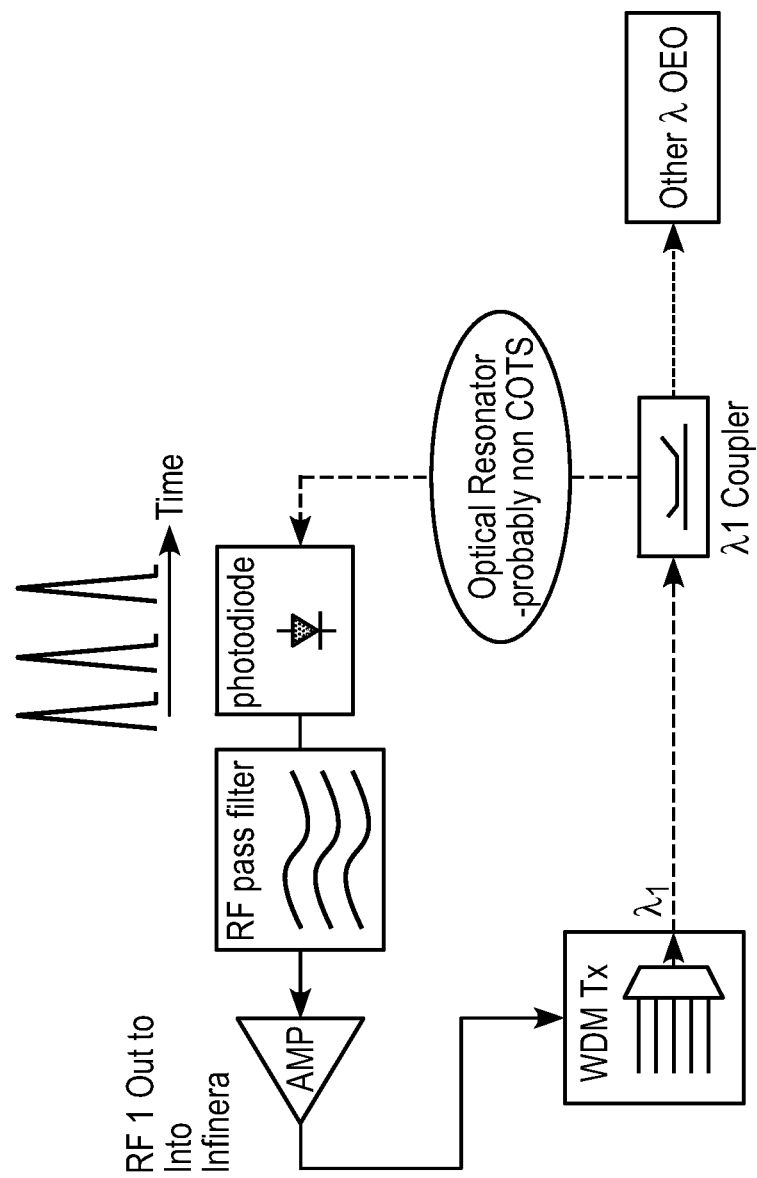
FIG. 4 is a schematic diagram of a further form of the present invention showing a system for the generation of microwave carriers using a high grade, ultra-low jitter OEO.
Figure 5:
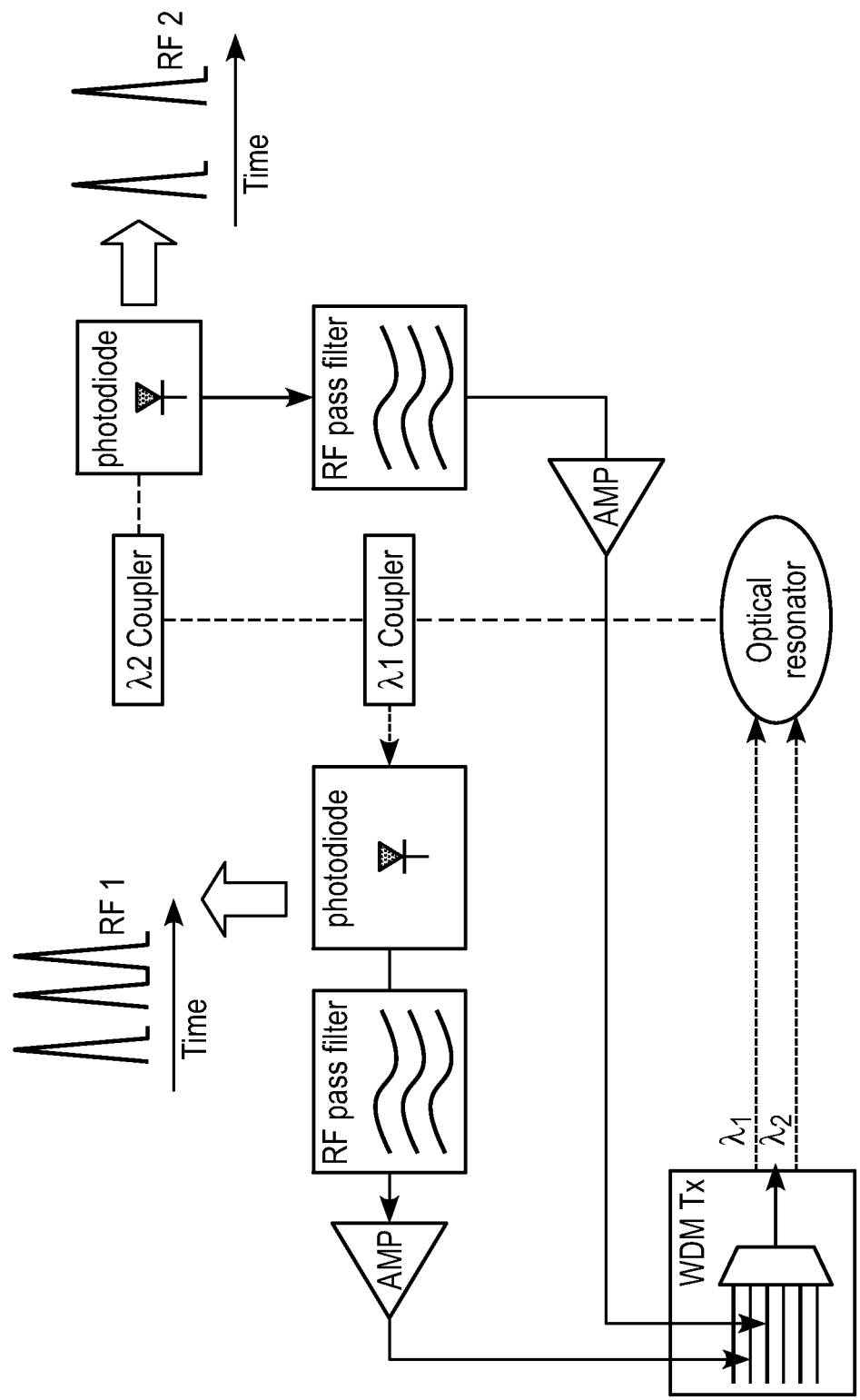
FIG. 5 is a schematic diagram of a further form of the present invention showing a microwave RF comb by OEO generating simple to multiple 10's in a compact space.

As can be seen in FIG. 1, in use LO RF signals are imposed on multiple optical wavelengths using the MZ modulators. The LO frequency of each optical channel is spaced as a comb of frequencies with a spacing equal to or less than the highest frequency an individual ADCs can analyse. The number of LO frequency spacings, when added together, is such that the total RF bandwidth of interest from the antenna is covered, as shown in FIG. 2.

The RF signal from the antenna imposes an RF signal via one optical ZM modulator onto all the optical wavelengths, see FIG. 1.

The optical sidebands from the LO on each wavelength beat with the sideband created by the modulator at the antenna. Thus each optical wavelength will have an RF beat frequency which the individual analogue to digital converter (ADC) on that that optical wavelength can analyse, or the beat frequency will be so high or low (or RF filtered out) that it will blind to the signal.

The data output from the ADC will be input into digital signal processing (DSP) means for analysis. The RF antenna signal from the known LO signals can be down converted on each optical wavelength. By combining the information on each optical wavelength the information for the total RF Antenna signal bandwidth of interest can be built up.

In this way, the invention provides a method of down converting the wide bandwidth microwave (RF) signal spectrum into lower frequencies so that processing electronics can more precisely analyse the signals.

The efficiency of RF down converting photonically depends on many things. There will be optical losses. Firstly, a large fraction of the optical carrier wavelength will be put into the optical RF side bands: this requires the use of MZ single side bands (SSBs) currently available as single channel COTS products. Additionally, this requires biasing a standard COTS MZ modulator at $\pi/2$ to produce two 2 f side bands either side of the carrier then using both side bands to mix with the sidebands from the MZ modulator at the antenna. This is a new method of using COTS components in a known way but achieves a desired effect and a new function. There are advantages and disadvantages to be having two sidebands rather than one—say by the use of and SSB MZ. Having two side band means there are more cross products which adds complexity and each side band has half the power. However, the two sidebands are known 4×LO spacings apart so thus one signal can used to reduce the noise on the second. The use of 2 f has advantages in improving LO break through.

In the specific case where using two 2 f sidebands become problematic a COTS photonic filter, such as a Micron Fabry Perrott or fibre Bragg, can be used to remove one of the sidebands.

There can also be optical losses due to interconnects, misalignment, dB loss per distance in the component material (not the fibre) and the complexity of the device—Y splitter and couplers and other components. However, there are also significant advantages. For example, it will be appreciated that there is the possibility to expand the process to multiple sub-bandwidths in parallel. Furthermore, the invention can be applied to multiple RF bands by using several optical wavelengths. The invention also provides the possibility of remotely positioning the RF input component from the rest of the signal processing means.

Additionally, power also can be supplied by fibre thus reducing the requirement of electrical power at the wing, periscopes, top or UAV. This is a light and flexible method of getting power to inaccessible places. The same physical fibre can be used for the RF transmission with the correct selection of components.

The use of fibre technology also enables high dynamic range signals and ultra wide bandwidth signals to be piped from the antenna. Fibre is a good transmission medium for such signals as there is no loss of signal quality—no loss of power or distortion of the signal over say, the size a military platform. Also fibre is EMC free and withstands high temperature and is light and flexible.

Use of fibre transmission allows relatively low power and simple small analogue systems at the wing edge, periscope top, or UAV (drone) where space and power is at a premium and the environment more hostile. The required analogue signal can then be piped back via the fibre where more space power and the environment is more benign. Serviceability is also improved by this approach. Moreover, the high Q values attainable with photonics could enable RF filtering performance that is not practical in the electronic domain.

OEO photonic oscillators are close to being the lowest phase noise oscillators available at room temperature. OEOs can be used to make the LO signals and comb, as described above and as the system is now in the optical domain, where increased TEC power and RF power can be issues, MZ modulators OEO is convenient method of doing this.

A primary issue in holding back the use of fibres and photonics in such systems historically has been the limited dynamic range of an optical link for high EW RF bandwidths. The dynamic range in an optical fibre system is the signal to noise from the noise floor to the distortion introduced by the optical modulator. There are methods of decreasing distortion of optical modulation but these typically only remove a few dB of distortion and they typically involve the use of non-COTS components and more optically lossy. It is therefore better to lower noise to increase dynamic range.

The noise floor is typically a combination of RIN (relative intensity noise) of a laser used in the photonic system; shot noise (the number of photons per second arriving); the dark current of the photodiode; and Johnson noise from the resistance of the total electrical circuit. For a high dynamic range optical link, the noise is typically dominated by the RIN as there is enough optical power in the link. The lasers typically are Distributed Feedback (DFB) lasers—some lasers are made to be low RIN.

The noise power for all the above sources increases with bandwidth.

The dynamic range can be improved by decreasing the noise, by decreasing the RF bandwidth on each optical channel thereby decreasing the noise floor. In the systems described here, Electronic Warfare specifications can be achieved with readily available COTS components. Traditionally, purpose built photonic devices are expensive to manufacture but using COTS components can significantly reduce the cost of such systems.

It is an object of the present system to provide small, light, low power systems at the antenna—where space and power is limited. Having simple components at the antenna be capable of withstanding the environment at the antenna, where temperature range experienced can be an issue, readily available and suitably rugged for the specific application. The main problem in using COTS products is likely to the temperature range for a military environment. Use of fibres as transmission means allows these sensitive devices to be remotely positioned in places on platforms such as avionics bays where there is better control of the environment.

Therefore, the present invention proposes to decrease the bandwidth of an optical channel so the required dynamic range is achieved over the limited bandwidth. To allow the full EW bandwidth, the system will simply add the information from many optical channels each carrying information from their part of the RF comb. It should be noted that the comb can be made dynamic if the number of channel is limited by size or cost—such different parts of the RF spectrum can be analysed at any one time. Parts of the comb can overlap to give redundancy and therefore robustness.

A decrease in bandwidth on each optical channel allows more noisy but integrated lasers to be used, such as integrated devices. Monolithically integrated lasers are typically inferior in quality but they can massively save on size and cost because typically 90% of the cost and 99% of the volume of a single channel device is the packaging. Thus laser, modulators and multiplexers can be combined on one die. It will be appreciated that there are devices available such as integrated monolithic receivers that combine demux, where demux is the reverse of mux—meaning an AWG (Arrayed Waveguide Grating) separates each optical wavelength into separate physical channels, optical amplifiers and photodiodes.

In the systems described above, many optical channels may be used to cover the EW total bandwidth required, one wavelength for every 0.2 GHz, for example channels to cover EW bands. For example, ten lasers, ten modulators and mux (this is an AWG, used to put all the optical wavelengths on one physical optical channel then to a fibre out) can be integrated on a 2.5 cm square package. Although up to 40 lasers and 40 modulators has been achieved.

Whilst bandwidth of the system is limited by the analogue to digital conversion, without RF filtering, this is not significant as the overlap of the different RF frequencies can be removed in software.

It will be appreciated that low frequency, high number of bit multiple ADCs are cheaply available in integrated strips of silicon. Such low frequency ADCs are advantageous because they have a lower power consumption and allow higher number of bits of resolution.

EW—Fo bands calibration can be deconvoluted in software. Historically systems are made and measure to conform to a certain performance specification. In this case there are many more channels with varying performance—and because data processing is more powerful than it used to be the unadjusted performance of the system may be measured when exposed to a calibrated EW RF spectrum—thus the wavy performance over the band (slightly more sensitive at some frequencies than others) can be normalised out (and saved). This way is cheaper—less fiddling (optimising) of the multiple channels. Also if there is an overlapping redundancy in the channels, if one channel is less than perfect the channels either side can make up the deficiency.

If required, robustness to big signals in the way of sampling of small signals can be achieved using RF filters or ×100 smaller photonic filters (when compared to conventional microwave filters).

As the system described above uses optical systems, it makes sense to also generate other required functions such as, for example, the RF com and any RF filtering, photonically. The size and power consumption of individual photonic circuits is a major hindrance for their use. However the power consumption and size does not increase significantly for multiple optical channels or more functionality (particularly if integrated within one package).

For example, the size of an integrated 40 channel device is about the same size of a single laser and modulator and it also requires about the same power since thermoelectric cooling is required and the use of a thermoelectric cooler (TEC) dominates the power consumption. This power consumption is substantially the same for one channel as for 40 channels.

Microwave photonic filters are typically 10× smaller and lighter compared to traditional RF filters, so the use of such devices is also advantageous.

Very low phase noise RF oscillators and RF combs can also be made using optical electronic oscillators (OEOs). (remove what follows in pink) and these can be made the addition of a high Q resonance cavity. Again from the prior art, "Moreover, the high Q values attainable with photonics could enable filtering performance that is not practical in the electronic domain"

The Q can be as high as 1E10 to 1E12 at the optical frequencies of 200 THz whereas the Q at microwave frequencies of 20 GHz is 1E3 to 1E4. The ratio of frequency to Q is 20,000 to 200 for optical and 20,000,000 to 2,000,000 for microwaves. Thus microwave photonic filtering is better both in terms of narrowness of bandwidth rejection and physical size.

Advantageously, the invention utilises standard optical component technologies including dual Mach-Zehnder modulators, optical single-side-band modulators and wavelength multiplexing.

Using multiple cheaper smaller lower frequency devices, this gives us a volume saving of 30-100%.

ADCs are large discrete components that run hot. If more channels are required it may be possible to run more, cheaper ADCs of a lower power. The more channels used, the closer the channels are to the EW signals being input so the signal to noise ratio is improved.

The output current from the photodiodes to the ADC bank has a dynamic range dependent on the laser intensity input, therefore it may be necessary to restrict the bandwidth.

It will be appreciated that any number of channels may be anticipated, however, increasing the channel number may lead to increased cost as the devices required would be more complex.

It will be appreciated that the system can cope with missing channels in the event that there are errors on the chips and ICs used. Many of the devices used in the system are already in use in other fields but may used as COTs products in this system.

It will be appreciated that a standard MZ modulator is biased using a DC voltage. In the present invention more efficient conversion in RF sidebands may be used that enable a skew dependent on the application envisaged for the system.

Furthermore, channelisation is better in the present system, of the order of 30 dB in the optical domain.

Using photonics to signal processing therefore provides a number of advantages as provided by the present invention over the prior art.

The invention claimed is:

1. A method of down converting input signals of a wide bandwidth microwave (RF) signal spectrum into lower frequencies using photonics such that processing electronics can more precisely analyse the signals, the method comprising:
    providing a plurality of optical wavelength channels in parallel;
    combining the optical wavelength channels and, passing the combined optical wavelength channels through a modulator;
    passing a received antenna signal through said modulator, the modulator outputting an optical signal having characteristics relating to the input antenna signal;
    generating an output signal by deconvoluting the signal output from the modulator;
    splitting the combined optical wavelength channels back to the plurality of parallel optical wavelength channels, and
    imposing a LO RF signal on each of the plurality of parallel optical wavelength channels, the frequency of the imposed LO RF signals being different for each of the parallel optical wavelength channels.

2. A method according to claim 1 the deconvoluting comprising:
    inputting the output signal into a digital signal processor (DSP) and;
    analysing the signal by downconverting known input signals, on each optical wavelength input such that information for the total RF Antenna signal bandwidth of interest can be built up.

3. A device for down converting input signals of a wide bandwidth RF antenna signal in to lower frequencies, the device comprising:
    a plurality of radiation emitters each of the plurality of radiation emitters emitting wavelength channels comprising radiation of a different wavelength, arranged such that radiation emitted will be input to a WDM transmitter, an output of the WDM transmitter being output to a modulator, the modulator receiving the RF antenna signal, an output of the modulator being shifted by an amount in relation to the RF antenna signal; and
    a WDM receiver, the WDM receiver receiving the signal output by the modulator and outputting a plurality of parallel signals directly relating to an RF signal received by the RF antenna to a plurality of ADCs, the ADCs outputting signals to digital signal processor for onward processing,
    wherein the device comprises RF oscillators that each generate LO RF signals of different frequencies, and a plurality of further modulators arranged to impose a different LO RF signal of the LO RF signals of different frequencies on a different wavelength channel.

4. A device according to claim 3 in which the WDM transmitter comprises:
    a further modulator and an array waveguide grating.

5. A device according to claim 4 in which the modulator and the further modulator comprise:
    a Mach-Zehnder modulator.

6. A device according to claim 5, in which the WDM receiver comprises:
    an array waveguide grating and a photodiode array.

7. A device according to claim 6, in which the antenna comprises:
a radar antenna.

8. A device according to claim 7, in which the radiation emitters comprise:
laser emitters.

9. A device according to claim 8, in which the number of radiation emitters is a number from 2 to 40.

10. A device according to claim 9, in which the digital signal processor is configured to perform signal processing by photonics.

11. A device according to claim 3, in which the WDM receiver comprises:
an array waveguide grating and a photodiode array.

12. A device according to claim 3, in which the antenna comprises:
a radar antenna.

13. A device according to claim 3, in which the radiation emitters comprise:
laser emitters.

14. A device according to claim 3, in which the number of radiation emitters is a number from 2 to 40.

15. A device according to claim 3, in which the digital signal processor is configured to perform signal processing by photonics.

16. A method of down converting input signals of a wide bandwidth microwave (RF) signal spectrum into lower frequencies using photonics such that processing electronics can more precisely analyse the signals, the method comprising:

providing a plurality of optical wavelength channels in parallel;

combining the optical wavelength channels and passing the combined optical wavelengths channels through a modulator;

passing a received antenna signal through said modulator, the modulator outputting an optical signal having characteristics relating to the received antenna signal; and generating an output signal by:
splitting the combined optical wavelength channels back into the plurality parallel of optical wavelength channels, and imposing a LO RF signal on each of the plurality of parallel optical wavelength channels, wherein a frequency of the imposed LO RF signals being different for each of the parallel optical wavelength channels.

* * * * *